Patented Feb. 9, 1943

2,310,556

UNITED STATES PATENT OFFICE 2,310,556

ELECTRIC WELDING MACHINE

George F. Strong, Grosse Pointe Farms, Mich.

Application April 11, 1941, Serial No. 388,051

1 Claim. (Cl. 74—110)

This invention relates to electric welding machines and particularly spot welding machines.

An object of the invention is to provide an improved and simplified means for electrically actuating an electrode to and from the work and for pressing it firmly against the work.

Another object is to actuate a reciprocatory electrode to its welding position through a linkage serving to largely multiply pressure derived from an electrical energizing means.

A further object is to provide a simple adjustment for said pressure-multiplying actuating mechanism, that will permit application of the same electrode pressure to different thicknesses of work.

These and various other objects are attained by the construction hereinafter described and illustrated in the accompanying drawings, wherein.

Figure 1:
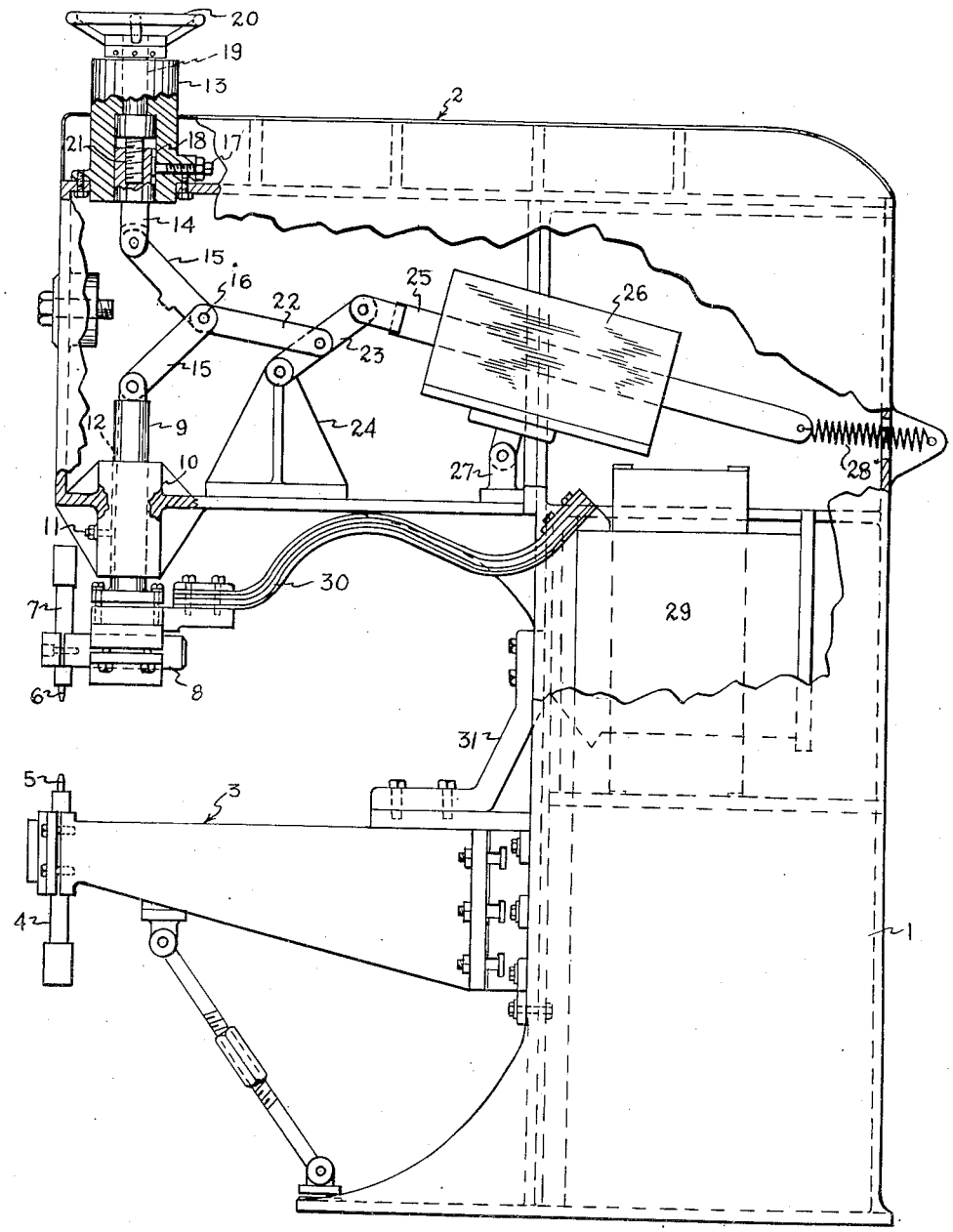
Fig. 1 is a side view of a spot welding machine, with a portion thereof broken away to show an electrode actuating mechanism, the actuated electrode being shown in raised or idle position.
Figure 2:
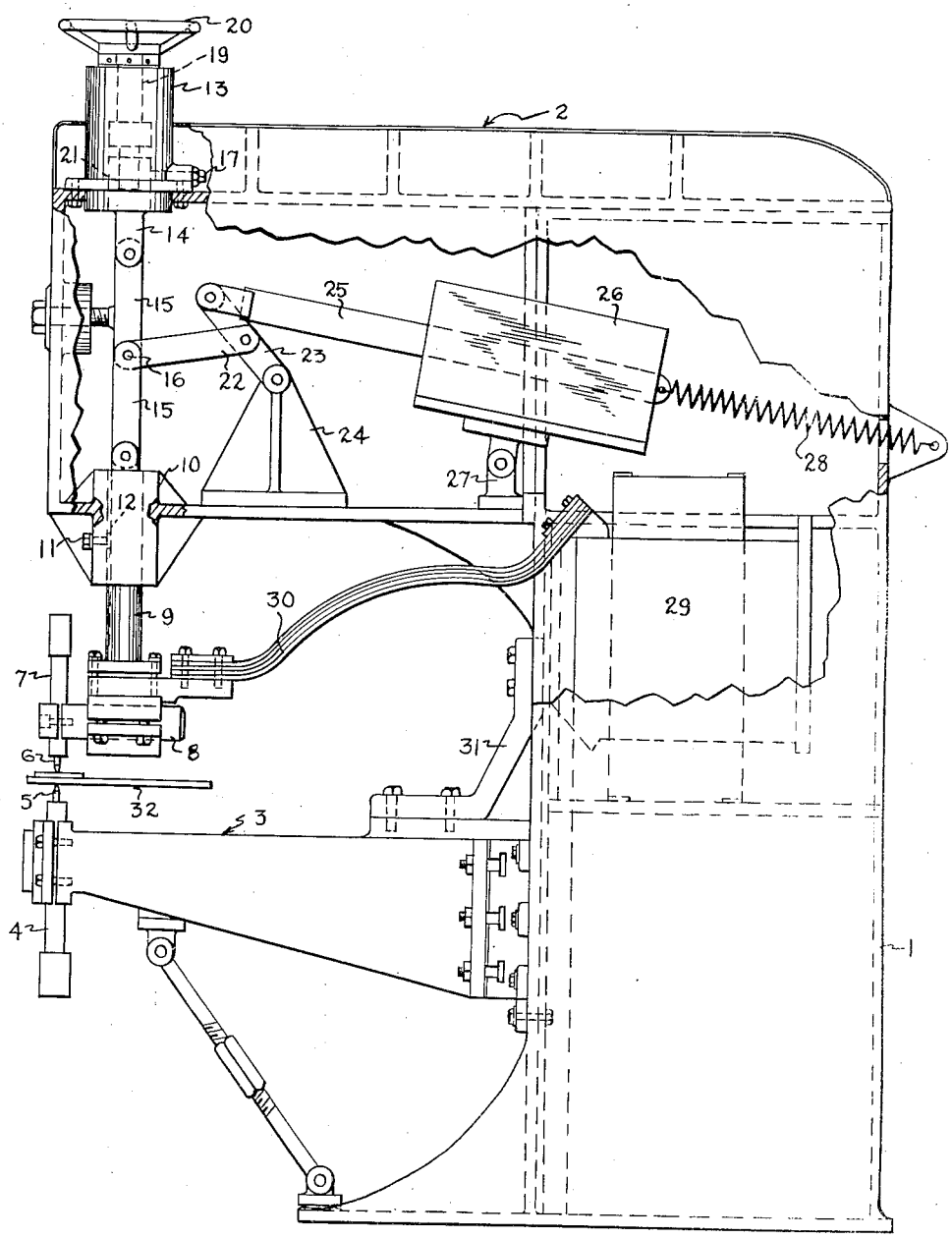
Fig. 2 is a view of said mechanism, showing the electrode in lowered or welding position.

In these views, the reference character 1 designates a hollow frame, having a forwardly projecting upper portion 2 and carrying a forwardly projecting bracket 3, downwardly spaced from the portion 2. Fixed on the front end portion of the bracket 3 is a holder 4 for an upwardly projecting electrode 5, and a coacting electrode 6 projects downwardly from a holder 7 secured by a shank 8 on the lower end of a plunger 9. Said plunger is vertically slidable in a bearing 10 integrally depending from the frame portion 2, and a bolt 11 set into said bearing terminally engages in a key-way 12 of the plunger to prevent its rotation.

The top of the frame projection 2 is formed with a bearing 13 in which a head 14 is slidingly adjustable to and from the plunger 9, said head and plunger being connected by a pair of toggle links 15 interconnected at 16. Said links are prevented from swinging beyond alignment by an adjustable stop 16a formed by a screw mounted in the front wall of the frame portion 2 and positioned to engage one of the links. The head 14 is restrained from rotation by the key-forming end of a bolt 17, engaged in a key-way 18 of said head. Rotative in the top portion of the bearing 13 is a shaft 19, projecting above said bearing to receive an actuating hand wheel 20, the lower portion of said shaft forming a feed screw 21 engaged in the head 14 to adjust it vertically.

For applying pressure to the links 15, a thrust link 22 extends from the interconnection 16 to a lever 23 having a lower end fulcrumed on a bracket 24 and its upper end pivotally engaged and forwardly actuable by the slide bar 25 of a "recipromotor" 26. This term designates a type of motor, commercially available, and utilizing the energy of suitable field coils (not shown) to inductively or electro-magnetically effect lengthwise travel of a bar under considerable force. It is preferred to pivot the recipromotor upon an underlying bracket 27, thus allowing the motor to adjust itself to swinging of the lever 23. A coiled spring 28 connected to the rear end of the reciprocating bar 25 holds the same normally retracted and thus normally maintains a raised position of the plunger 9 and electrode 6.

Preferably the frame 1 serves as a housing for a transformer 29 supplying current to the electrode 6 through a flexible cable 30 and to the electrode 5 through a conductor 31.

In use of the described machine, the operator closes the circuit of the recipromotor 26, after disposing work 32 in a desired position of engagement with the lower electrode. The bar 25 is immediately thrust forward and acts through the lever 23 and link 22 to shift the toggle links into substantial alignment, thus forcing the plunger 9 downwardly. The head 14 has been previously so adjusted that electrode 6 engages the work slightly in advance of alignment of the toggle links. Thus the very powerful end thrust exerted by the links, in approaching alignment is utilized to strongly press the electrode against the work. Upon completion of each spot weld, the recipromotor circuit is broken, and spring 28 raises the electrode 6. The quick response of the described mechanism to its electrical control permits a row of spot welds to be produced at maximum speed.

Rotation of the hand wheel 20 permits the mounting for the upper end of the toggle linkage to be quickly and accurately adjusted up or down to suit different thicknesses of work.

Commercial recipromotors particularly lend themselves to the purpose herein disclosed, because they are compact, capable of exerting a powerful thrust, and may be easily regulated to increase or diminish such thrust.

What I claim is:

In a toggle mechanism, the combination with a pair of toggle links having pivotally joined ends, of an anchorage member pivotally mounting the other end of one of said links, a plunger pivoted to and actuable by the other end of the other link, an arm pivoted to swing in the approximate plane of the links, a link for varying the divergency of the toggle links, extending from said arm to the juncture of the toggle links, a bar pivoted to said arm and reciprocatory to actuate the arm and a support for said bar pivotal to compensate for swinging of the arm.

GEORGE F. STRONG.